US012732653B2

(12) United States Patent
Oklejas et al.

(10) Patent No.: US 12,732,653 B2
(45) Date of Patent: Sep. 8, 2026

(54) HYBRID AUDIO/VISUAL IMAGERY ENTERTAINMENT SYSTEM WITH LIVE AUDIO STREAM PLAYOUT AND SEPARATE LIVE OR PRERECORDED VISUAL IMAGERY STREAM PLAYOUT

(71) Applicant: e Scapes Network LLC, Monroe, MI (US)

(72) Inventors: Robert A Oklejas, Newport, MI (US); Dragan Cerovcevic, Kettering, OH (US); Roy Radakovich, Trenton, MI (US)

(73) Assignee: e Scapes Network LLC, Monroe, MI (US)

( * ) Notice: Subject to any disclaimer, the term of this patent is extended or adjusted under 35 U.S.C. 154(b) by 0 days.

(21) Appl. No.: 19/418,352

(22) Filed: Dec. 12, 2025

(65) Prior Publication Data

US 2026/0101087 A1 Apr. 9, 2026

Related U.S. Application Data

(63) Continuation of application No. 19/095,635, filed on Mar. 31, 2025, now abandoned, which is a continuation of application No. 17/952,724, filed on Sep. 26, 2022, now abandoned.

(60) Provisional application No. 63/249,223, filed on Sep. 28, 2021.

(51) Int. Cl.

| | |
|---|---|
| ***H04N 21/239*** | (2011.01) |
| ***H04N 21/2187*** | (2011.01) |
| ***H04N 21/262*** | (2011.01) |
| ***H04N 21/2665*** | (2011.01) |
| ***H04N 21/462*** | (2011.01) |

(52) U.S. Cl.

CPC ..... *H04N 21/2393* (2013.01); *H04N 21/2187* (2013.01); *H04N 21/26208* (2013.01); *H04N 21/2625* (2013.01); *H04N 21/26275* (2013.01); *H04N 21/2665* (2013.01); *H04N 21/4622* (2013.01)

(58) Field of Classification Search

CPC .......... H04N 21/4622; H04N 21/2187; H04N 21/26208; H04N 21/2625; H04N 21/26275; H04N 21/2665; H04N 21/2393

USPC ........................................................ 725/86

See application file for complete search history.

(56) References Cited

U.S. PATENT DOCUMENTS

| | | | | |
|---|---|---|---|---|
| 6,249,324 | B1 * | 6/2001 | Sato | G06T 9/005 348/705 |
| 7,634,531 | B2 * | 12/2009 | Abdolsalehi | H04L 65/611 709/217 |
| 2008/0209482 | A1 * | 8/2008 | Meek | H04N 21/439 725/105 |

(Continued)

*Primary Examiner* — Benjamin R Bruckart

*Assistant Examiner* — Alexander Boyd

(74) *Attorney, Agent, or Firm* — Howard & Howard Attorneys PLLC

(57) ABSTRACT

A hybrid audio and visual imagery entertainment system that combines visual imagery obtained as live visual imagery or prerecorded visual imagery with the transmission of live audio displayed on a display for therapeutic benefit to a user. Each of the visual imagery and audio of the system can be viewed or heard by the user on its own; however, it is designed to be viewed and heard simultaneously but where the audio and visual imagery streams are separate and unsynchronized and displayed on a display for viewing and hearing by a user.

20 Claims, 1 Drawing Sheet

(56) References Cited

U.S. PATENT DOCUMENTS

| | | | | |
|---|---|---|---|---|
| 2010/0088730 | A1* | 4/2010 | Oklejas | H04N 21/47202 725/74 |
| 2012/0284421 | A1* | 11/2012 | Xiao | H04N 21/4316 709/231 |
| 2017/0026702 | A1* | 1/2017 | Oklejas | H04N 21/23424 |
| 2018/0103235 | A1* | 4/2018 | Clavel | H04N 21/25891 |
| 2021/0082382 | A1* | 3/2021 | Pinhas | G06F 16/685 |

* cited by examiner

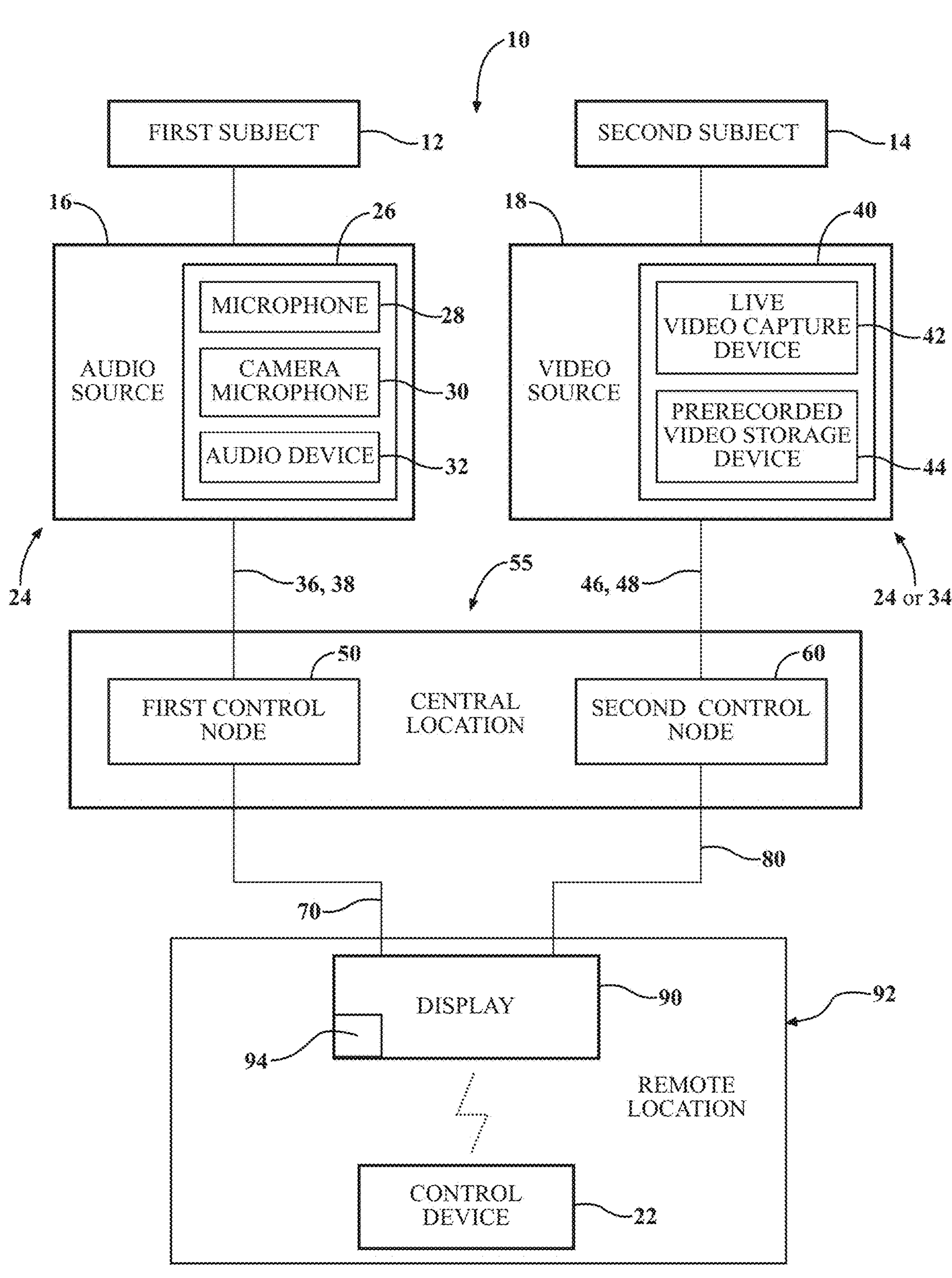
10
FIRST SUBJECT
12
SECOND SUBJECT
14
16
26
18
40
MICROPHONE
28
AUDIO SOURCE
CAMERA MICROPHONE
30
AUDIO DEVICE
32
VIDEO SOURCE
LIVE VIDEO CAPTURE DEVICE
42
PRERECORDED VIDEO STORAGE DEVICE
44
24
36, 38
55
46, 48
24 or 34
50
60
FIRST CONTROL NODE
CENTRAL LOCATION
SECOND CONTROL NODE
80
70
DISPLAY
90
92
94
REMOTE LOCATION
CONTROL DEVICE
22

HYBRID AUDIO/VISUAL IMAGERY ENTERTAINMENT SYSTEM WITH LIVE AUDIO STREAM PLAYOUT AND SEPARATE LIVE OR PRERECORDED VISUAL IMAGERY STREAM PLAYOUT

CROSS REFERENCE TO RELATED APPLICATIONS

The present disclosure is a continuation of U.S. patent application Ser. No. 19/095,635, filed on Mar. 31, 2025, which is a continuation of U.S. patent application Ser. No. 17/952,724, filed on Sep. 26, 2022, which claims priority from U.S. Provisional Patent Application No. 63/249,223, filed on Sep. 28, 2021, the entirety of which are herein incorporated by reference.

FIELD OF THE DISCLOSURE

The subject disclosure relates to a hybrid audio/visual imagery entertainment system, particularly one adapted to delivering therapeutic benefits to the viewer.

BACKGROUND OF THE DISCLOSURE AND ADVANTAGES

In Enerchi Health, a web based health information service, it was stated that "People generally feel that they live cluttered, hectic, overwhelming lives; between work, family, and friends, or any of the dozens of things that fill our days and tax our body and mind, rarely do we take even a small part of our waking life entirely for ourselves, apart from unhealthy "escapist" kinds of relaxation like TV that don't allow the mind to settle down. The almost permanent state of stimulation and stress inevitably has dire consequences for both mental and physical health, from higher blood pressure to compromised immune systems, leaving us vulnerable to any number of conditions. Making a priority of taking "time out" every day to simply withdraw from the whole mess can be a big step toward improving health."

Frantic programming seeks to draw the viewer to ever narrower fields of interests, but with more intensely focused programming. The result is that there are dozens of entire networks devoted 24 hours per day, seven days per week to a single subject; i.e., The Food Network, History Channel, HGTV, etc. Far from producing a mental "time out", current programming adds gasoline to the fire of stress and information overload.

Moreover, there is a large and growing demographic segment that seeks to escape TV entirely, or to use it only occasionally as a quick source of news, in favor of a more tranquil and relaxing lifestyle. This demographic segment includes a mature, upscale audience that appreciates and desires to experience tranquil, relaxing places, preferably with beautiful, breathtaking scenery. Still further, another segment seeks to enhance their ability to combine audio and visual imagery content in a more aesthetically pleasing manner from what can be seen or selected using traditional television and cable channels.

SUMMARY OF THE DISCLOSURE

In one aspect of the subject disclosure, a hybrid audio and visual imagery system provide separate and unsynchronized audio and visual imagery streams to a display at a remote location for viewing by a user.

The system includes a first feed consisting essentially of an audio signal not embedded with a video signal with the first feed conveying continuously live sound of a first subject. The system also includes a second feed consisting essentially of a visual imagery signal not embedded with an audio signal with the second feed conveying live visual imagery or prerecorded visual imagery of a second subject distinct, separate and independent to the conveyed live sound of the first feed. The system also includes a control device located at the remote location, with the control signals from the user generated by the control device. The system also includes a first control node in communication with the control device and located at a central location at which the first feed is received, the first control node having a first input comprising the first feed and a first portion of the control signals associated with the audio signal and having a first output signal comprising a first user feed, the first output signal from the first control node received by the control device. Still further, the system includes a second control node in communication with the control device and located at the central location at which the second feed is received, the second control node having a second input comprising the second feed and a second portion of the control signals associated with the visual imagery signal, and having a second output signal distinct and separate from the first output signal comprising a second user feed, the second output signal from the second control node received by the control device. Finally, the system includes a display located at the remote location and coupled to the control device, The system includes wherein the sound of the first subject conveyed by the first user feed and the visual imagery of the second subject conveyed by the second user feed are independently outputted by the display as a single combined resulting product that is not a unified audio/visual product, wherein the first portion of the control signals is processed only by the first control node and not by the second control node, and wherein the second portion of the control signals is processed only by the second control node and not by the first control node.

The subject application also provides an associated method for independently providing visual imagery and/or audio to a display at a remote location in response to control signals received from a user at the remote location. The method includes:

- receiving a first feed comprising an audio signal not embedded with a visual imagery signal, the first feed conveying continuously live sound of a first subject;
- receiving a second feed independent of the first feed, the second feed comprising a visual imagery signal not embedded with an audio signal with the audio signal of the first feed isolated from the visual imagery signal of the second feed, the second feed conveying live visual imagery or prerecorded visual imagery of a second subject supplemental and separate to the conveyed continuously live sound of the first feed;
- generating control signals from a control device located at the remote location;
- communicating a first portion of the control signals associated with the audio signal to a first control node located at a central location, the first control node having a first input comprising the first feed and a first output signal comprising a first user feed;
- communicating a second portion of the control signals associated with the visual imagery signal to a second control node located at the central location, the second control node having a second input comprising the second feed and a second output signal distinct and separate from the first output signal comprising a second user feed;

receiving the first and second output signals at the control device; and outputting the sound of the first subject conveyed by the first user feed and the visual imagery of the second subject conveyed by the second user feed independently as a single combined resulting product on a display at the remote location, wherein the resulting product is not a unified audio/visual product, wherein the first portion of the control signals is processed only by the first control node and not by the second control node, and wherein the second portion of the control signals is processed only by the second control node and not by the first control node.

BRIEF DESCRIPTION OF THE DRAWINGS

FIG. 1 shows a diagram of one embodiment of the subject disclosure as described below.

DETAILED DESCRIPTION OF THE PREFERRED EMBODIMENTS

With reference to FIG. 1, and in operation, the subject disclosure provides a hybrid audio and visual imagery system 10 for providing separate, and unsynchronized, live audio (i.e., a live audio stream), and either prerecorded or live visual imagery (i.e., a live visual imagery stream or a prerecorded video stream), to a display 90 (i.e., a user display 90), which includes an associated speaker 94, viewable at a remote location 92 by a user in response to a control signal sent by a user through a control device 22.

The system 10 includes an audio source 16, a visual imagery source 18, a first control node 50, a second control node 60, and the control device 22.

The control device 22 may include a hand-held remote controller as well as an associated digital cable or satellite transceiver unit respectively controlled thereby to which the user display 90 is connected. The control devices 22 allow the user to navigate through a series of menus (not shown) presented on the respective display 90.

The audio source 16 is in the form of "live" sound captured at a respective first location 24 (such as a sound studio or the like) by an audio capturing device 26 from a subject 12 (i.e., a first subject 12). Stated another way, for the purposes of this disclosure, the audio source 16 refers to the "live" sound captured by the audio capturing device 26 that is contemporaneously heard through the display by the user, as described further below. "Live" could also be referred to as any source whereby the user/listener is not directly selecting the audio, but such audio is coming from a separate or remote source such as through a computer-generated audio stream.

In certain embodiments, the audio source 16 refers to the "live" sound captured by the audio capturing device 26 from a single first subject 12. However, in other embodiments, the audio source 16 refers to the "live" sound from multiple distinct first subjects 12 that are each be captured individually by a single audio capturing device 26 or multiple distinct audio capturing devices 26 (i.e., the audio source 16 refers to "n" audio sources 16, with "n" being a number one (for a single audio source 16) or any number greater than one (for multiple audio sources 16) being respectively captured by one or more audio capturing devices 26). Collectively, hereinafter, the "audio source 16" may refer to any one or more of the "n" audio sources 16 provided herein.

Each audio capturing device 26 can be at least one stand-alone microphone 28, and/or at least one microphone 30 provided as part of at least one camera (i.e., a "camera microphone" with lead line 30 as illustrated in FIG. 1) which can hereinafter be referred to as either camera 30 or camera microphone 30, or any other audio device 32 or devices that can capture "live" sound generated from the first subject 12 and contemporaneously transmit the captured sound in the form of an audio output signal (i.e., an audio feed 36 including an audio signal 38) to a first control node 50 at a central location 55, described further below. The number of distinct audio sources 16 corresponds to the number of distinct audio feeds 36 and audio signals 38 (i.e., when there are "n" audio sources 16, there is "n" distinct audio feeds 36 and audio signals 38).

The cameras 30 utilized that include the microphones may be hand-held cameras or can be remotely controlled High Definition Television (HDT) system camera viewing the first subject 12. The microphone may be a microphone working in conjunction with the HDT system camera 30 at the first location 24 to acquire the local environmental sounds that are being produced by the first subject 12. Still further audio devices 32 for capturing audio may include, for example, digital radio or internet radio or a live curator/creator audio stream.

The sound captured by any or all of the audio capturing devices 26 from the first subject 12 may include, but is not limited to, musical selections and a possible optional human voice spoken by an "on-air" personality that are produced live at the first location 24. Stated another way, the first subject 12 does not refer strictly to a sound generated by a human (such as talking or singing), but any source that is capable of generating sound captured by the audio capturing device 26 and the first location 24. Such sound from the first subject 12 may be deliberately selected for its aesthetically appealing qualities that produce a relaxation or calming effect on the human psyche.

The visual imagery source 18 is in the form of visual imagery that may also be produced at the respective first location 24 or at another location 34 (i.e., a second location 34 such as a television studio or a film set or the like) of a second subject 14 at the respective first location 24 or second location 34.

The visual imagery of the visual imagery source 18 may be in the form of a "live" visual imagery of the second subject 14 that is captured by a visual imagery capturing device 40 or alternatively may be in the form of "prerecorded" visual imagery that has previously been captured and stored on the visual imagery capturing device 40. The "prerecorded" visual imagery may be a still shot or a video recording of a predetermined length. Similar to the audio sound, the visual imagery from second subject 14 may be deliberately selected for its aesthetically appealing qualities that produce a relaxation or calming effect on the human psyche.

For "live" visual imagery, the visual imagery capturing device 40 is in the form of one or more live video capturing devices 42, such as live video capturing cameras 42 or any other device or devices that can capture "live" visual imagery generated from the second subject 14 and contemporaneously transmit the captured visual imagery in the form of a visual imagery output signal (i.e., a visual imagery feed 46 including a visual imagery signal 48) as directed by the control signal from the user to a second control node 60 at the central location 55, described further below. The cameras 42 utilized as a live video capturing device 42 may be hand-held cameras or can be remotely controlled High Definition Television system camera viewing the second subject 14.

Similar to the audio source 16, in certain embodiments, the "live" visual imagery source 18 refers to the "live" visual imagery sources 18 from multiple distinct second subjects 14 that are each be captured individually by a single visual imagery capturing device 40 or multiple distinct visual imagery capturing devices 40 (i.e., the "live" visual imagery source 18 refers to "m" visual imagery sources 18, with "m" being one (for a single visual imagery source 18) or greater than one (for multiple visual imagery sources 18) captured by the one or more visual imagery capturing devices 40 and in particular from the one or more live video capturing devices 42). Collectively, hereinafter, the "visual imagery source 18" may refer to any one or more of the "n" visual imagery sources 18 provided herein.

For "prerecorded" visual imagery, the visual imagery capturing device 40 includes one or more prerecorded visual imagery storage devices 44 that store prerecorded (i.e., previously recorded) visual imagery, as described above, generated from the second subject 14 and can subsequently transmit the captured visual imagery in the form of a visual imagery output signal (i.e., the visual imagery feed 46 including the visual imagery signal 48) as directed by the control signal from the user to a second control node 60 at the central location 55, described further below. Accordingly, the term "subsequently transmit" as it relates to the prerecorded visual includes a delayed transmission time from the time in which the video was recorded and stored onto the storage device 44, which may be as short as a few seconds or as long as multiple years or more.

As noted above, the system 10 also includes a first control node 50 and a second control node 60 that may be each located at a central location 55 as shown in FIG. 1, such as a central studio. Alternatively, the first and second control nodes 50, 60 may be located in two distinct locations, such as a first and second studio (not shown).

The first control node 50 is coupled to the audio source 16, and in particular is coupled to the audio capturing device 26 of each of the "n" audio sources 16 (i.e., is coupled to one or more of the one or microphones 28, the microphones of the one or more cameras 30, or the other audio device 32 of each respective one of the "n" audio sources 16 as described above) including, for example, digital radio or internet radio or a live curator/creator audio stream as described above.

The first control node 50 receives a first portion of the control signals from the control device 22 associated with audio control of the display 90 and also receives the "n" audio feeds 36 (i.e., a first feed 36) in the form of the "n" audio signals 38 from the "n" audio sources 16 by either digital satellite or digital cable and contemporaneously provides an output signal including the user audio feed 70 to the display 90 as a function of the received first portion of the control signal. In particular, the first portion of the control signals selects one of the "n" audio signals 38 received at the first control node 50, with the first control node 50 contemporaneously providing an output signal including the user audio feed 70 to the display 90 corresponding to the selected one audio signal 38 of the audio feed 36 from the respective one audio source 16 as a function of the received first portion of the control signal.

The display 90 reproduces the "live" sounds conveyed by the user audio feed 70 that correspond to the first portion of the control signal received (and corresponding to the selected one audio signal 38) and broadcasts the audio via a speaker or the like that are included on the display 90 that can be heard by the user.

The audio that is heard by the user through the display 90 is the "live" sound that is produced by the first subject 12 as one of the respective "n" audio sources 16 captured by the audio capturing device 26 associated with the respective one chosen audio source 16, contemporaneously sent from the respective one audio source 16 to the first control node 50 via the audio feed 36 corresponding to the selected one audio signal 38, contemporaneously sent from the first control node 50 to the display 90 via the user audio feed 70, and contemporaneously heard through the speakers of the display 90. The portion of the control signals sent by the user through the control device 22, in addition to being able to select one of the respective "n" audio feeds 36 from the respective one audio source 16, can be used to turn on or off the audio on the display 90 or to control the volume of the generated audio from the display 90. However, the user does not control the content of the "live" audio of the audio feed 36 from the respective one audio source 16, but instead simply hears the sound contemporaneously captured by the audio capturing device 26 from the first subject 12 of the audio feed 36 from the respective one audio source 16. Accordingly, the audio that is heard by the user through the display 90 is akin to a "live" radio broadcast from the first subject 12 of the audio feed 36 from the respective one audio source 16. However, the user can control what audio is actually heard through the display 90 by selecting from the potential "live" audio sources 16 through the control device 22, and thus different genres of audio that are available from the first subject 12 and associated with the different "live" audio sources can be selected by sending additional control signals from the control device 22 that are received by the first control node 50 to alter the user audio feed 70 that is sent to the display 90.

The second control node 60 receives a second portion of the control signals from the control device 22 (distinct from the first portion of the control signals from the control device 22) associated with visual imagery control of the display 90 and also receives the visual imagery feed 46 (i.e., a second feed 46) in the form of the visual imagery signal 48 from the visual imagery source 18 by either digital satellite or digital cable and contemporaneously provides an output signal including the user visual imagery feed 80 to the display 90 as a function of the received second portion of control signal. The display 90 reproduces the visual imagery conveyed by the user visual imagery feed 80 that correspond to the second portion of the control signal received by the control device 22 and broadcasts the visual imagery via a monitor or the like that are included on the display 90 that can be viewed by the user.

In this configuration, as one of skill appreciated, the first portion of the control signals received from the control device 22 is processed only by the first control node 50 and not by the second control node 60, while the second portion of the control signals received from the control device 22 is processed only by the second control node 60 and not by the first control node 50.

In certain instances, the visual display that is desired to be viewed by the user through the display 90 is the one of the "live" visual displays that is produced by the second subject 14, captured by the visual imagery capturing device 40 of one of the respective "m" visual imagery sources 18, contemporaneously sent from the one visual imagery source 18 to the second control node 60 via the second feed 46, contemporaneously sent from the second control node 60 to the display 90 via the user visual imagery feed 80, and contemporaneously reproduced and viewed by the user through the display 90 and associated with the selected one of the "m" live visual imagery sources 18. The second portion of the control signals sent by the user through the control device 22 can be used to turn on or off the "live" visual display on the display 90. However, the user does not control the content of the "live" visual display through the display 90, as this visual display is the same "live" visual display that is being contemporaneously produced by the second subject 14. Accordingly, the visual display that is viewed by the user through the display 90 is akin to a "live" visual display viewed from a television or computer or the like. While the user does not control the content of the "live" visual display, the user can control what visual imagery is actually seen through the display 90 by selecting from the potential "live" visual imagery sources 18, and thus different genres of visual imagery that are available from the second subject 14 and associated with the different "live" visual imagery sources can be selected by sending additional control signals from the control device 22 that are received by the second control node 60 to alter the visual imagery feed 80 that is sent to the display 90.

Alternatively, when the visual display that is desired to be viewed by the user through the display 90 is the "prerecorded" visual imagery (i.e., "prerecorded video") stored on the prerecorded visual imagery storage device 44, the user has enhanced control over what can be displayed through the display 90. In particular, the system 10 can be implemented wherein the user can send the second portion of the control signal via the control device 22 and select any prerecorded video that has been stored on the visual imagery source 18, and in particular on the prerecorded visual imagery storage device 44 and adjust the timing of the viewing of this selected prerecorded video to start or stop at any time. In this way, the user can vary the visual content displayed through the display 90 as desired to correspond to the "live" visual imagery that may also be simultaneously but separately displayed and create a desired listening and viewing effect.

As noted above, a large and growing demographic segment of TV viewers, in seeking a more tranquil and relaxing lifestyle, are moving away from TV entirely or only occasionally using it as a quick source of news. Individuals in this demographic segment seek freedom from the chaos, fear and stress of everyday life, and to temporarily divorce themselves from certain aspects of their working lives or the world we live in, such as 24 hours news, email, cell phones, text messaging, voicemail, deadlines, travel warnings, etc. This segment tends to be mature and includes a discerning, upscale audience that can appreciate, and recognizes value in, products and services of various types (e.g., luxury-market automobiles or timepieces, premium luggage, business clothing, jewelry, luxury hotel chains and resorts, cruise lines, travel bureaus, etc.) associated with the prestigious, carefully-selected brand advertising that lends itself well to the television format and system of the subject disclosure. However, this segment includes anyone who seeks a break from stress and is not in any way limited to any demographic. Such viewers often seek to experience, and appreciate the benefits of, tranquility and relaxation.

Thus, an embodiment of the subject disclosure provides an entertainment system and format that includes appropriate "continuously live" audio and/or appropriate "live" or "prerecorded" visual imagery for the goal of an aesthetically and aurally pleasing and relaxing experience for the user. In certain embodiments, it may be a therapeutic experience for the user, which may provide in certain circumstances a mental and/or physical benefit to the user.

The audio experience provides a continuously live listening experience for the user and may utilize live locale sounds such as nature, surf, running water, rain, foghorn, or other soothing therapeutic sounds such as music or musical interludes. It may also include sounds from humans alone or in combination with the other live locale or soothing therapeutic sounds as describe.

The visual entertainment production method captures the most aesthetically pleasing live visuals available at any particular time. It may alternatively use prerecorded visual imagery with aesthetically pleasing visual presentations, and thus provides a low cost method for providing unique video and audio content. However, as opposed to live television, the system provides separate and unsynchronized audio and visual imagery streams to a display at a remote location for viewing by a user. Stated another way, the audio signal is not embedded in the video signal, and hence the resulting product that results is not a unified audio/visual product. In this respect, the resulting audio streams of the product according to the subject disclosure is akin to traditional live radio in which the audio signal is consumed in the instant that it is broadcast and is not intended to be recorded and repeated for rebroadcast at a future date.

The subject disclosure is aimed at providing the positive therapeutic effects of a "time out" that would enhance mental and physical health, by virtually transporting the viewer to another, more relaxing scene, which can be experienced visually and/or audibly. The audio and visual imagery experience can be independently controlled by the user, who uses the control device 22 to send control signals associated with the independent selection of the audio and visual imagery content.

It will, of course, be understood that the foregoing description is of a preferred exemplary embodiment of the disclosure and that the disclosure is not limited to the specific embodiments shown. Other changes and modifications will become apparent to those skilled in the art and all such changes and modifications are intended to be within the scope of the subject disclosure.

What is claimed is:

1. A hybrid audio and visual imagery system comprising:

a first feed consisting essentially of an audio signal not embedded with a video signal with said first feed conveying continuously live sound of a first subject;

a second feed consisting essentially of a visual imagery signal not embedded with an audio signal with said second feed conveying live visual imagery or prerecorded visual imagery of a second subject distinct, separate and independent to said conveyed live sound of said first feed;

a control device located at a remote location, with control signals from a user generated by said control device, a first control node in communication with said control device and located at a central location at which said first feed is received, said first control node having a first input comprising said first feed and a first portion of said control signals associated with said audio signal, and having a first output signal comprising a first user feed, said first output signal from said first control node received by said control device, a second control node in communication with said control device and located at said central location at which said second feed is received, said second control node having a second input comprising said second feed and a second portion of said control signals associated with said visual imagery signal, and having a second output signal distinct and separate from said first output signal comprising a second user feed, said second output signal from said second control node received by said control device, and a display located at the remote location and coupled to said control device, wherein a sound of said first subject conveyed by said first user feed and said visual imagery of said second subject conveyed by said second user feed are independently outputted by said display as a single combined resulting product that is not a unified audio/visual product and wherein the sound of the first subject conveyed by the first user feed and the visual imagery of the second subject conveyed by the second user feed are each independently selected to provide a relaxation or calming effect on the human psyche of the user, wherein said first portion of said control signals is processed only by said first control node and not by said second control node, and wherein said second portion of said control signals is processed only by said second control node and not by said first control node.

2. The hybrid audio and visual imagery system of claim 1, wherein said continuously live sound of said first subject conveyed by said first user feed and outputted by said display comprises continuously live human voice sounds or continuously live non-human sounds or continuously live music.

3. The hybrid audio and visual imagery system of claim 1, wherein said continuously live sound of said first subject conveyed by said first user feed and outputted by said display comprises continuously live prerecorded music or continuously live prerecorded sounds played through an audio playing device.

4. The hybrid audio and visual imagery system of claim 1, wherein said continuously live sound of said first subject is acquired by a microphone and outputted as said first feed from said microphone to said first control node.

5. The hybrid audio and visual imagery system of claim 1, wherein said live or prerecorded visual imagery of said second subject conveyed by said second user feed and outputted by said display comprises live visual imagery of said second subject conveyed by said second user feed and outputted by said display, wherein said live visual imagery of said second subject is acquired by a camera and outputted as said second feed from said camera to said second control node.

6. The hybrid audio and visual imagery system of claim 1, wherein said live or prerecorded visual imagery of said second subject conveyed by said second user feed and outputted by said display comprises prerecorded visual imagery of said second subject conveyed by said second user feed and outputted by said display.

7. The hybrid audio and visual imagery system of claim 6, wherein said prerecorded visual imagery of said second subject is acquired by a camera and recorded on a recording device through visual imagery outputs from said camera, and wherein said prerecorded visual imagery is subsequently outputted as said second feed from said recording device to said second control node.

8. The hybrid audio and visual imagery system of claim 6, wherein said prerecorded visual imagery of said second subject is stored on a storage device, and wherein said prerecorded visual imagery is subsequently outputted as said second feed from said storage device to said second control node.

9. The hybrid audio and visual imagery system of claim 1, wherein said user sends said first portion of said control signals from said control device to said first control node for controlling a receipt of said first user feed to said display, and wherein said user sends said second portion of said control signals from said control device to said second control node for controlling a receipt of said second user feed to said display.

10. The hybrid audio and visual imagery system of claim 1, wherein said user sends said second portion of said control signals from said control device to said second control node for selecting between said live visual imagery and said prerecorded visual imagery.

11. The hybrid audio and visual imagery system of claim 1, wherein said first control node is coupled to "n" selectable live audio sources and said second control node is coupled to "m" selectable visual imagery sources, wherein "n" comprises one or more audio sources and wherein "m" comprises one or more visual imagery sources, and wherein a first portion of said control signals select one of said "n" audio sources and wherein a second portion of said control signals select one of said "m" visual imagery sources.

12. A method for independently providing visual imagery and/or audio to a display at a remote location in response to control signals received from a user at the remote location, comprising:

receiving a first feed comprising an audio signal not embedded with a visual imagery signal, the first feed conveying continuously live sound of a first subject;

receiving a second feed independent of the first feed, the second feed comprising a visual imagery signal not embedded with an audio signal with the audio signal of the first feed isolated from the visual imagery signal of the second feed, the second feed conveying live visual imagery or prerecorded visual imagery of a second subject supplemental and separate to the conveyed continuously live sound of the first feed;

generating control signals from a control device located at the remote location;

communicating a first portion of the control signals associated with the audio signal to a first control node located at a central location, the first control node having a first input comprising the first feed and a first output signal comprising a first user feed;

communicating a second portion of the control signals associated with the visual imagery signal to a second control node located at the central location, the second control node having a second input comprising the second feed and a second output signal distinct and separate from the first output signal comprising a second user feed;

receiving the first and second output signals at the control device; and outputting the sound of the first subject conveyed by the first user feed and the visual imagery of the second subject conveyed by the second user feed independently as a single combined resulting product on a display at the remote location, wherein the resulting product is not a unified audio/visual product and wherein the sound of the first subject conveyed by the first user feed and the visual imagery of the second subject conveyed by the second user feed are each independently selected to provide a relaxation or calming effect on the human psyche of the user, wherein the first portion of the control signals is processed only by the first control node and not by the second control node, and wherein the second portion of the control signals is processed only by the second control node and not by the first control node.

13. The method of claim 12, wherein the visual imagery of the second subject conveyed by the second user feed and outputted by the display comprises live visual imagery of the second subject, and wherein the method further comprises acquiring the live visual imagery of the second subject by a camera and outputting it as the second feed from the camera to the second control node.

14. The method of claim 12, wherein the visual imagery of the second subject conveyed by the second user feed and outputted by the display comprises prerecorded visual imagery of the second subject, and wherein the method further comprises acquiring the prerecorded visual imagery of the second subject by a camera and recording it on a recording device through visual imagery outputs from the camera, and subsequently outputting the prerecorded visual imagery as the second feed from the recording device to the second control node.

15. The method of claim 14, further comprising storing the prerecorded visual imagery of the second subject on a storage device, and subsequently outputting the prerecorded visual imagery as the second feed from the storage device to the second control node.

16. The method of claim 12, further comprising:

sending the first portion of the control signals from the control device to the first control node for controlling a receipt of the first user feed to the display, and sending the second portion of the control signals from the control device to the second control node for controlling a receipt of the second user feed to the display.

17. The method of claim 12, further comprising:

selecting the audio signal by the user from one or more audio signals, with each one of the one or more audio signals corresponding to a respective one audio source of one or more audio sources, and selecting the visual imagery signal by the user from one or more visual imagery signals, with each one of the one or more visual imagery signals corresponding to a respective one visual imagery source of one or more visual imagery sources.

18. The method of claim 12 further comprising maintaining the first user feed as a continuous, uninterrupted live audio stream while changing the selected visual imagery signal from the second user feed.

19. The method of claim 18 further comprising starting, stopping, or seeking playback of prerecorded visual imagery in the second user feed.

20. The method of claim 12 further comprising maintaining the first user feed as a continuous, uninterrupted live audio stream while starting, stopping, or seeking playback of prerecorded visual imagery in the second user feed.

* * * * *